United States Patent
Handa et al.

(10) Patent No.: US 11,840,752 B2
(45) Date of Patent: Dec. 12, 2023

(54) LOW THERMAL EXPANSION ALLOY HAVING EXCELLENT LOW TEMPERATURE STABILITY AND METHOD FOR PRODUCING SAME

(71) Applicant: NIPPON CHUZO K.K., Kawasaki (JP)

(72) Inventors: Takuo Handa, Kawasaki (JP); Shimin Ryu, Kawasaki (JP); Nobuyuki Oyama, Kawasaki (JP); Masaru Washio, Kawasaki (JP)

(73) Assignee: NIPPON CHUZO K.K., Kawasaki (JP)

( * ) Notice: Subject to any disclaimer, the term of this patent is extended or adjusted under 35 U.S.C. 154(b) by 0 days.

(21) Appl. No.: 17/435,780

(22) PCT Filed: Feb. 20, 2020

(86) PCT No.: PCT/JP2020/006778
§ 371 (c)(1),
(2) Date: Sep. 2, 2021

(87) PCT Pub. No.: WO2020/195405
PCT Pub. Date: Oct. 1, 2020

(65) Prior Publication Data
US 2022/0049332 A1  Feb. 17, 2022

(30) Foreign Application Priority Data
Mar. 26, 2019  (JP) ................... 2019-058063

(51) Int. Cl.
C22C 38/10 (2006.01)
C22C 33/02 (2006.01)
(Continued)

(52) U.S. Cl.
CPC ........ *C22C 38/105* (2013.01); *C22C 33/0285* (2013.01); *C22C 38/02* (2013.01);
(Continued)

(58) Field of Classification Search
None
See application file for complete search history.

(56) References Cited

U.S. PATENT DOCUMENTS

| 5,476,633 A | 12/1995 | Sokolowski et al. |
| 2011/0203511 A1 | 8/2011 | Kuramoto |

FOREIGN PATENT DOCUMENTS

| DE | 19920144 C1 | 8/2000 | |
| JP | 60021331 A * | 2/1985 | ............. C21D 8/005 |

(Continued)

OTHER PUBLICATIONS

Asgari, Hamed, et al. "On Thermal Expansion Behavior of Invar Alloy Fabricated by Modulated Laser Powder Bed Fusion." Materials & Design, vol. 160, 2018, pp. 895-905. (Year: 2018).*

(Continued)

*Primary Examiner* — Anthony M Liang
(74) *Attorney, Agent, or Firm* — RATNERPRESTIA

(57) ABSTRACT

Provided is a low thermal expansion alloy that contains, in mass %, not more than 0.015% of C, not more than 0.10% of Si, not more than 0.15% of Mn, 35.0-37.0% of Ni, and less than 2.0% of Co. Ni+0.8Co is 35.0-37.0%, and the remaining portion is Fe and unavoidable impurities. The low thermal expansion alloy has a solidification structure in which the secondary dendrite-arm spacing is 5 μm or less, has an average thermal expansion coefficient in a range of 0±0.2 ppm/° C. at 100° C. to −70° C., and has an Ms point of −196° C. or less.

6 Claims, 3 Drawing Sheets

(51) Int. Cl.
  *C22C 38/04*   (2006.01)
  *C22C 38/02*   (2006.01)
  *B23K 26/342*  (2014.01)
  *B22F 10/28*   (2021.01)

(52) U.S. Cl.
  CPC .............. *C22C 38/04* (2013.01); *B22F 10/28* (2021.01); *B22F 2301/35* (2013.01); *B23K 26/342* (2015.10)

(56) References Cited

FOREIGN PATENT DOCUMENTS

| | | | |
|---|---|---|---|
| JP | 0931588 A | | 2/1997 |
| JP | 2000129399 A | | 5/2000 |
| JP | 2000212701 A | * | 8/2000 |
| JP | 2004217947 A | | 8/2004 |
| JP | 2005207869 A | | 8/2005 |
| JP | 2011174854 A | | 9/2011 |
| JP | 2016027187 A | | 2/2016 |
| WO | 2019044093 A1 | | 3/2019 |
| WO | 2019171689 A1 | | 9/2019 |

OTHER PUBLICATIONS

International Preliminary Report on Patentability for International Application No. PCT/JP2020/006778, dated Sep. 28, 2021 with translation, 12 pages.
International Search Report and Written Opinion for International Application No. PCT/JP2020/006778, dated May 19, 2020, 7 pages.
Technology for Cast Steel Production, Sokeizai Center, with partial translation, 13 pages.
Yamada et al., "Mechanical Properties of Cast Iron with Copper Alloy Mould", Casting, 1991, vol. 63, No. 11 with partial translation, 8 pages.
Kamio, "Refinement of Solidification Structure in Aluminum Alloys", Journal of Japan Foundry Engineering Society, 1996, vol. 68, No. 12 with partial translation, 11 pages.
"Cast Structure Refinement of Cu—Zn—Si Alloys", Sokeizai, 2013, vol. 54, No. 1 with partial translation, 3 pages.
Yakout et al., "A study of thermal expansion coefficients and microstructure during selective laser melting of Invar 36 and stainless steel 316L", Additive Manufacturing, Dec. 1, 2018, vol. 24, pp. 405-418, XP055926641.
Extended European Search Report for European Application No. 20 779 916.4, dated Jun. 10, 2022, 11 pages.

* cited by examiner

INVENTIVE EXAMPLE No. 7
DAS = 1.4μm

COMPARATIVE EXAMPLE A No. 17
DAS = 16μm

LOW THERMAL EXPANSION ALLOY HAVING EXCELLENT LOW TEMPERATURE STABILITY AND METHOD FOR PRODUCING SAME

CROSS REFERENCE TO RELATED APPLICATIONS

This is the U.S. National Phase application of PCT/JP2020/006778, filed Feb. 20, 2020, which claims priority to Japanese Patent Application No. 2019-058063, filed Mar. 26, 2019, the disclosures of these applications being incorporated herein by reference in their entireties for all purposes.

FIELD OF THE INVENTION

The present invention relates to a low thermal expansion alloy having excellent low temperature stability and a method for producing the same.

BACKGROUND OF THE INVENTION

Low thermal expansion alloy materials are applied for the purpose of minimizing heat deformation of precision devices in advanced technology fields caused by temperature change. When the thermal expansion coefficient is zero, heat deformation does not occur with temperature change, so that a material with such a thermal expansion coefficient is ideal.

Some members for aerospace instruments, measurement instruments and the like are used in a low temperature range, and sometimes used at temperatures of −100° C. or lower. There is a demand for an alloy material whose thermal expansion coefficient does not sharply change in association with a structure change even in such a low temperature range and whose thermal expansion coefficient in the temperature range between 100° C. and −70° C. falls within the range of 0±0.2 ppm/° C., which can be regarded as practically zero.

At present, Fe—Ni—Co based low thermal expansion alloys, typified by Super Invar (SI), are industrially utilized as low thermal expansion materials. SI is obtained by replacing part of Ni of a Fe-36% Ni alloy (Invar), whose thermal expansion coefficient is 1 to 2 ppm/° C. at or around room temperature, by Co to reduce the thermal expansion, and SI is a Fe-32% Ni-5% Co alloy having a thermal expansion coefficient of 1 ppm/° C. or less at or around room temperature.

Accordingly, SI is applied to members for precision devices for the purpose of minimizing a decrease in precision resulting from heat deformation. However, when Ni is replaced by Co, the amount of Ni decreases so that austenite is destabilized, and the temperature at which generation of martensite starts (hereinafter called "Ms point") moves toward a higher temperature side. The Ms point of SI increases up to −40° C. or thereabout although it varies more or less depending on the amount of impurities. Thus, the martensite structure is generated at or below this temperature, whereby the thermal expansion coefficient sharply increases and low thermal expansibility is impaired; therefore, the application of materials with such properties to members for aerospace instruments, measurement instruments and the like that are used in a low temperature range (paragraphs 0003 and 0034 of Patent Literature 1) is limited. Needless to say, it is impossible to attain zero expansion in the temperature range between 100° C. and −70° C.

Meanwhile, Invar has an Ms point of −196° C. or lower, so that the structure thereof does not change and its low expansibility is maintained even at or below −196° C., and therefore, Invar is applicable to aerospace instruments, measurement instruments and the like that are exposed to temperatures lower than −100° C. However, since the thermal expansion coefficient of Invar is 1 to 2 ppm/° C. which is higher than that of SI and is greatly distant from zero expansion, a heat deformation minimizing effect is not sufficient, and thus, invar cannot fulfill high level demands; therefore, the application of Invar to members for ultraprecision devices is limited (paragraph 0024 of Patent Literature 1).

Patent Literature 2 proposes irradiating alloy powder having specific composition with a laser or electron beam to melt and rapidly solidify the powder, thus carrying out additive manufacturing such that the secondary dendrite arm spacing becomes 5 µm or less, in order to attain both a thermal expansion coefficient of 0.5 ppm/° C. or lower and low temperature stability that cannot be obtained with SI.

According to Examples of Patent Literature 2, however, the thermal expansion coefficient is about 0.4 ppm/° C. in each case except for No. 7, and a material stably exhibiting zero expansion is not obtained. In addition, in the case of a device operating in a low temperature range, the lower the temperature at which the device can have low temperature stability, the better, and a material of the device is desired to have stability equivalent to that of Invar alloy; however, an Ms point of −196° C. or lower which is equivalent to that of Invar alloy cannot be obtained with the alloy of Patent Literature 2.

PATENT LITERATURE

Patent Literature 1: JP 2011-174854 A
Patent Literature 2: WO 2019/044093

SUMMARY OF THE INVENTION

As described above, with SI, the martensite structure is generated at such a low temperature as −100° C. whereby the thermal expansion coefficient sharply increases, and with Invar, the thermal expansion coefficient is 1 to 2 ppm/° C. and is insufficient in terms of a heat deformation minimizing effect. Moreover, it cannot be said that the low thermal expansion alloy of Patent Literature 2 stably exhibits zero expansion, and with this alloy, low temperature stability equivalent to that of Invar alloy cannot be obtained. Thus, there is no such a material that demonstrates zero expansion in the temperature range between 100° C. and −70° C. and that has low temperature stability equivalent to that of Invar alloy as of now.

The present invention aims at providing a low thermal expansion alloy that has an average thermal expansion coefficient in the temperature range between 100° C. and −70° C. of 0±0.2 ppm/° C. which can be regarded as practically zero and that has low temperature stability equivalent to that of Invar alloy, as well as a method for producing the low thermal expansion alloy.

The present invention provides the following (1) to (4).
(1) A low thermal expansion alloy comprising, in mass %:
C: 0.015% or less;
Si: 0.10% or less;
Mn: 0.15% or less;
Ni: 35.0% to 37.0%;

Co: less than 2.0%; and
Ni+0.8Co: 35.0% to 37.0%,
with the balance being Fe and inevitable impurities,
wherein the low thermal expansion alloy has solidification structure with a secondary dendrite arm spacing of 5 μm or less,
an average thermal expansion coefficient in a temperature range between 100° C. and −70° C. falls within a range of 0±0.2 ppm/° C., and
an Ms point is −196° C. or lower.

(2) The low thermal expansion alloy according to (1) above,
wherein contents of C, Si and Mn satisfy C×7+Si×1.5+Mn≤0.40.

(3) A method for producing a low thermal expansion alloy, the method comprising:
melting and solidifying a low thermal expansion alloy material having the composition according to (1) or (2) above by means of a laser or electron beam to carry out additive manufacturing, thereby producing a low thermal expansion alloy having an average thermal expansion coefficient in a temperature range between 100° C. and −70° C. falling within a range of 0±0.2 ppm/° C. and an Ms point of −196° C. or lower.

(4) The method for producing a low thermal expansion alloy according to (3) above,
wherein the low thermal expansion alloy material is powder.

The present invention provides a low thermal expansion alloy that has an average thermal expansion coefficient in the temperature range between 100° C. and −70° C. of 0±0.2 ppm/° C. which can be regarded as practically zero and that has low temperature stability equivalent to that of Invar alloy, as well as a method for producing the low thermal expansion alloy.

DETAILED DESCRIPTION OF THE INVENTION

Figure 1:
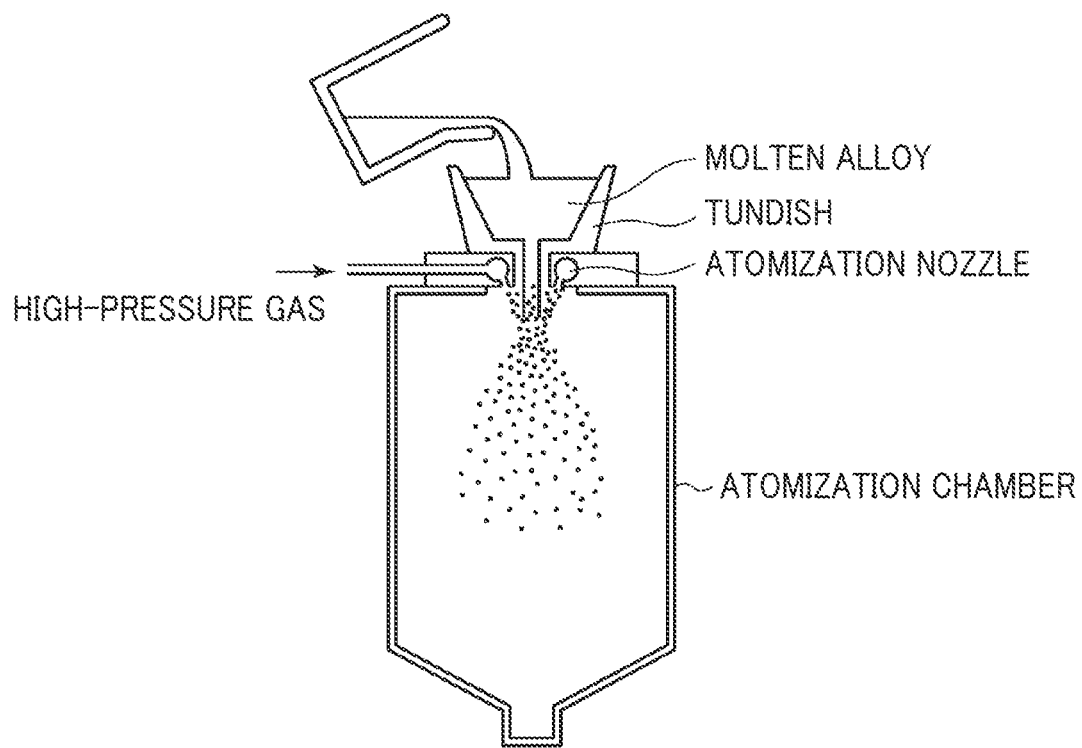
FIG. 1 is a conceptual diagram showing an atomizing device used in Examples of the invention.

As described above, while the largest factor that determines the thermal expansion coefficient of a Fe—Ni—Co based low thermal expansion alloy is the Co content, the addition of Co causes a lower relative amount of Ni, and due to this, austenite is destabilized and Ms increases. In the case of SI of 32% Ni-5% Co that demonstrates the lowest thermal expansion, the Ms point is about −40° C., so that the SI is not applicable at temperatures lower than that. Therefore, as long as an attempt is made to attain low thermal expansion by use of Co, it is difficult to stably have a thermal expansion coefficient of 0±0.2 ppm/° C. in the temperature range from room temperature or thereabout to −70° C.

The present inventors made a study on the technology of low thermal expansion that is not accompanied by an increase in the Ms point caused by the presence of Co as seen in a conventional Fe—Ni—Co based low thermal expansion alloy. As a result, the inventors found that by reducing the amounts of C, Si and Mn with use of Fi-36% Ni composition as the base and by making the microstructure smaller to have a secondary dendrite arm spacing of 5 μm or less, it is possible to have a thermal expansion coefficient in the temperature range between 100° C. and −70° C. of 0±0.2 ppm/° C. which can be regarded as practically zero and to obtain low temperature stability equivalent to that of Invar alloy.

The present invention has been completed based on those findings.

The reasons of limitations of the invention are described below separately for chemical components and manufacturing conditions.

In the following description, the percentage (%) used for components is "mass %" unless otherwise specified, and α represents the average thermal expansion coefficient in the temperature range between 100° C. and −70° C.

[Chemical Components]

C: 0.015% or Less

C is an element that remarkably increases α of the low thermal expansion alloy according to the invention, and thus, a low content thereof is preferred. When C is contained in an amount exceeding 0.015%, α exceeds the range of 0±0.2 ppm/° C. even if the contents of other elements described below are adjusted, and accordingly, the C content is set to be 0.015% or less.

Si: 0.10% or Less

Si is an element added for the purpose of reducing oxygen in the alloy. However, Si is an element that remarkably increases α of the low thermal expansion alloy according to the invention, and thus, a low content thereof is preferred. When the content thereof exceeds 0.10%, this makes an increase in α unignorable similarly to C. Accordingly, the Si content is set to be 0.10% or less.

Mn: 0.15% or Less

Mn is an element effective for deoxidation similarly to Si. However, Mn is an element that remarkably increases α of the low thermal expansion alloy according to the invention, and thus, a low content thereof is preferred. When the content thereof exceeds 0.15%, this makes an increase in α unignorable similarly to C. Accordingly, the Mn content is set to be 0.15% or less.

Ni: 35.0% to 37.0%

Ni is an element that determines a base value of α of the alloy. Ni needs to be adjusted to fall within the range described below based on the amount of Co in order to have α within the range of 0±0.2 ppm/° C. When Ni is less than 35.0% or more than 37.0%, it is difficult to have α within the range of 0±0.2 ppm/° C. even if the adjustment is made based on the amount of Co and manufacturing conditions to be described later are modified. Accordingly, the Ni content is set to be within the range of 35.0% to 37.0%.

Co: Less than 2.0%

Co is an important element that, together with Ni, determines α and is added to obtain a smaller value of α than that obtained when Ni is solely added. However, when Co is 2.0% or more, this causes a decrease in the amount of Ni that is determined by the relational expression between the amount of Ni and the amount of Co, which will be described later, and austenite is destabilized, so that the Ms point becomes a temperature higher than −196° C. Accordingly, the Co content is set to be less than 2.0%. In order to eliminate the need for management and measures as specified in the Ordinance on Prevention of Hazards Due to Specified Chemical Substances of the Industrial Safety and Health Act, the content of 1.0% or less is preferred.

Ni+0.8Co: 35.0% to 37.0%

A Fe—Ni—Co alloy can have remarkably low thermal expansibility when the amount of Ni and the amount of Co are within the above-specified ranges and also when a Ni equivalent (Nieq.) represented by Ni+0.8×Co falls within a certain range. When the Ni equivalent is less than 35.0% or more than 37.0%, in either case, a does not fall within the range of 0±0.2 ppm/° C. Accordingly, Ni+0.8Co that is the Ni equivalent is set to be within the range of 35.0% to 37.0%.

C×7+Si×1.5+Mn≤0.40

The Fe—Ni—Co alloy of the invention can have remarkably low thermal expansibility when the amount of C, the amount of Si and the amount of Mn are adjusted to be within the above-specified ranges and also when a value of the expression C×7+Si×1.5+Mn is 0.40 or less. Accordingly, it is preferable to establish C×7+Si×1.5+Mn≤0.40.

In the present invention, except for C, Si, Mn, Ni and Co, the balance is Fe and inevitable impurities.

[Solidification Structure]

Refinement of solidification structure leads to a smaller value of α. This is probably because microsegregation of Ni is reduced owing to refinement of the structure, as described above. In the low thermal expansion alloy according to the invention, the solidification structure is refined such that the secondary dendrite arm spacing (DAS) becomes 5 μm or less. By having a DAS of 5 μm or less in an alloy with the foregoing composition, α can fall within the range of 0±0.2 ppm/° C.

[Ms Point]

Since the low thermal expansion alloy according to the invention is configured to have a low Co content, a Ni content of 35% or more, and fine solidification structure as described above, the Ms point thereof is −196° C. or lower which is comparable to that of Invar alloy, and thus, low temperature stability as excellent as Invar alloy can be obtained.

[Manufacturing Conditions]

A low thermal expansion alloy material with the foregoing composition is melted and solidified with a laser or electron beam to carry out additive manufacturing. Owing to this configuration, after melted, the low thermal expansion alloy material is rapidly cooled to thereby obtain fine structure having a DAS of 5 μm or less. Thus, microsegregation of Ni is reduced, and α can fall within the range of 0±0.2 ppm/° C. However, any process is applicable as long as melting and solidifying conditions allowing to obtain fine solidification structure having a DAS of 5 μm or less are satisfied.

Specifically, alloy powder is prepared as the alloy material with the composition falling within the foregoing ranges, and the alloy powder is melted and solidified with a laser or electron beam to carry out additive manufacturing, thus obtaining an alloy with fine solidification structure having a DAS of 5 μm or less.

In additive manufacturing, fine solidification structure having a DAS of 5 μm or less can be obtained by setting a cooling rate in solidification of the alloy to be not less than 3000° C./sec. This cooling rate is satisfied as long as a laser or electron beam is used.

Figure 3:
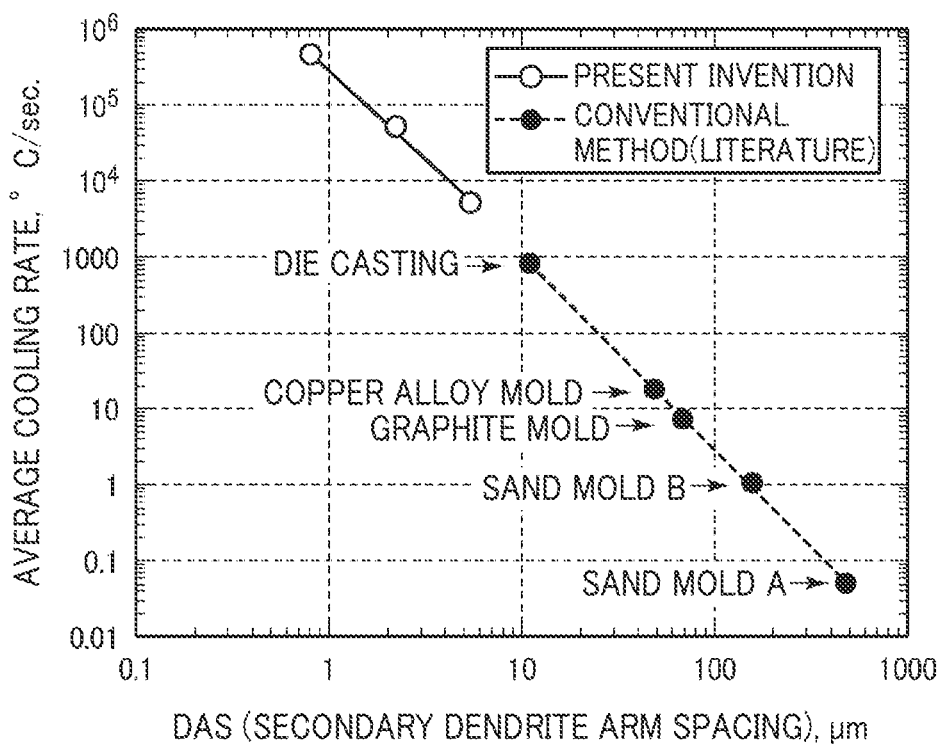
FIG. 3 is a graph showing the relationship between DAS and a cooling rate.
Figure 5:
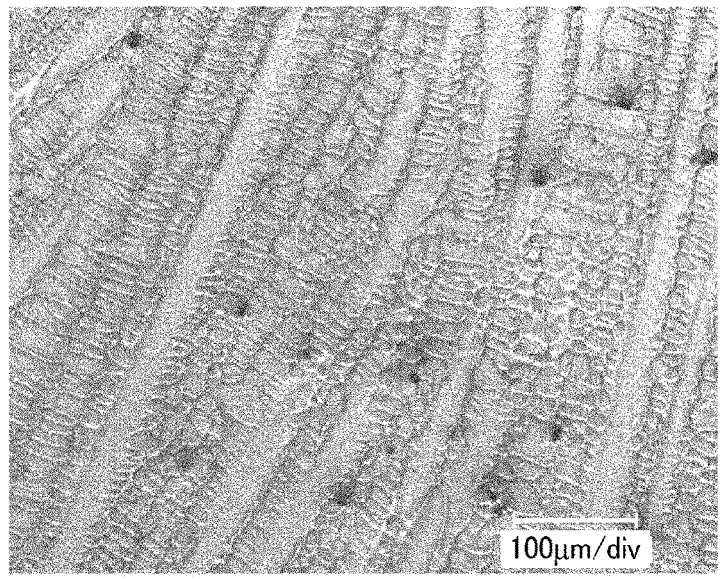
FIG. 5 is a photograph showing DAS of a casting made with a pure copper mold.

In contrast, as shown in FIG. 3 presented later, even with die casting that provides the highest cooling rate among conventional casting processes, the cooling rate is not enough to have a DAS of 5 μm or less. Not to mention, in the case of copper alloy molds that allow casting of iron-based alloys having high melting points such as the alloy of the invention, it is absolutely impossible to have a DAS of 5 μm or less as shown in FIG. 5 presented later, so that desired properties cannot be obtained.

According to the present invention, it is possible to obtain a low thermal expansion alloy that has an average thermal expansion coefficient in the temperature range between 100° C. and −70° C. of 0±0.2 ppm/° C. which can be regarded as practically zero and that has low temperature stability equivalent to that of Invar alloy.

The low thermal expansion alloy according to the invention is applicable to members for various precision devices that operate in a low temperature range, e.g., devices used in the aerospace field, while the application of conventional low thermal expansion alloys to such members is limited; thus, the low thermal expansion alloy according to the invention greatly contributes to higher precision in such fields.

Further, since SI that is a Fe—Ni—Co based low thermal expansion alloy contains Co in an amount of about 5%, the material cost thereof is high, and also SI meets the definition of a substance containing more than 1% of Co, which is specified in the Ordinance on Prevention of Hazards Due to Specified Chemical Substances of the Industrial Safety and Health Act as a substance that requires predetermined management and measures. In contrast, the low thermal expansion alloy according to the invention contains a small amount of Co, i.e., less than 2% of Co, so that the material cost can be prevented from elevating, and when the amount of Co is not more than 1 mass %, only the fact that Co is contained needs to be indicated, and predetermined management and measures as specified in the Ordinance on Prevention of Hazards Due to Specified Chemical Substances of the Industrial Safety and Health Act are not necessary.

Examples

Examples of the present invention are described below.

Samples were manufactured using alloys having chemical components and compositions by additive manufacturing or casting with a pure copper mold, as shown in Table 1.

Figure 2:
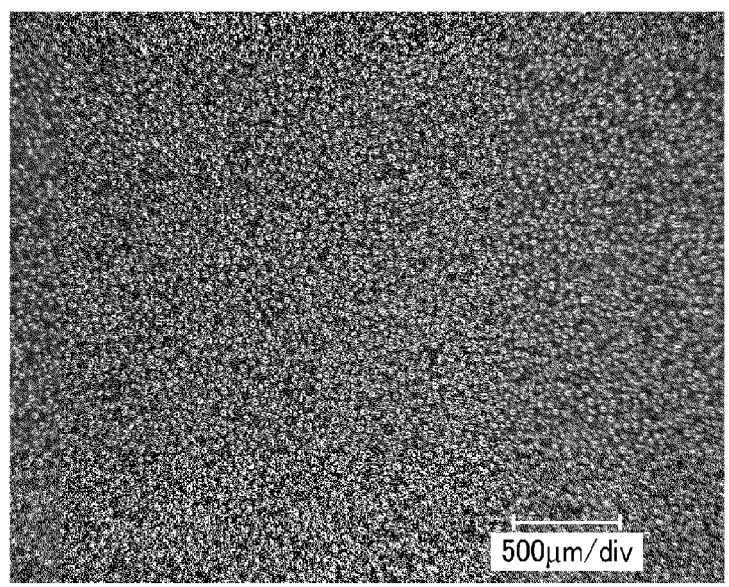
FIG. 2 is an optical micrograph showing spherical powder obtained with the atomizing device of FIG. 1.

For samples made by additive manufacturing, an alloy with chemical composition shown in Table 1 was melted in a high-frequency induction furnace, and using an atomization device shown in FIG. 1, the melted metal was allowed to drip, and was divided into droplets while being rapidly solidified by use of inert gas (in this example, nitrogen gas) sprayed through a nozzle, thereby obtaining spherical powder. Thereafter, the powder was sieved to obtain powder for additive manufacturing with a particle size of 10 to 45 μm shown in FIG. 2. The powder for additive manufacturing was subjected to additive manufacturing under those conditions with an output of 300 W, a laser movement rate of 1000 mm/sec, a laser scanning pitch of 0.1 mm and a powder lamination thickness of 0.04 mm. Thus, a sample of φ10×L 100 is produced.

Figure 6:
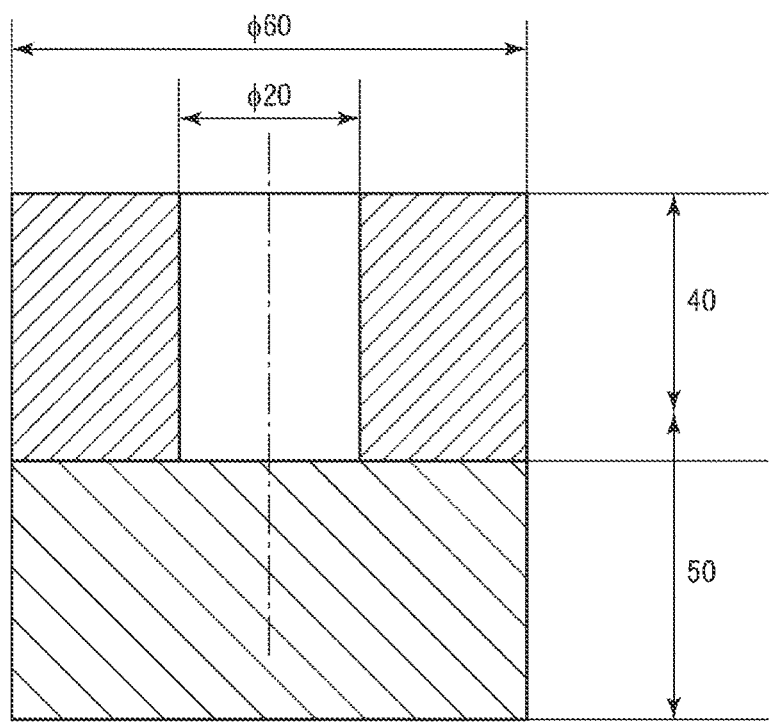
FIG. 6 is a view showing the pure copper mold.

For samples made by casting, about 100 g of alloy melted in a high-frequency induction furnace was casted in a pure copper mold shown in FIG. 6 at a casting temperature of 1550° C., and the resulting casting is taken out from the bottom end portion of the mold.

FIG. 3 shows estimated cooling rates of the samples that were obtained based on values of DAS actually measured by observing the structures of the respective samples of the invention with an optical microscope and also on an extrapolation line of the relationship between the DAS and the cooling rate described in Literature 1 stated below. The cooling rates of various types of molds obtained from information in Literatures 2 to 4 stated below are also presented.

$$R = (DAS/709)^{1/-0.386} \quad (1)$$

R: cooling rate (° C./min), DAS: secondary dendrite arm spacing (μm)

Literature 1: *Technology for Cast Steel Production*. P. 378, SOKEIZAI Center
Literature 2: *Casting*. Vol. 63 (1991) No. 11, P. 915
Literature 3: *Journal of Japan Foundry Engineering Society*. Vol. 68 (1996) No. 12, P. 1076
Literature 4: *Sokeizai*. Vol. 54 (2013) No. 1, P. 13

Each sample was separated from a base plate for additive manufacturing by wire-cut electrical discharge machining, and then machined to a thermal expansion test piece of φ6×50 mm. This test piece was heated at a rate of 2° C./min to measure its thermal expansion with a laser interference type thermal expansion meter, and α was determined from a thus-obtained thermal expansion curve.

For the Ms point, the thermal expansion test piece was set to the thermal expansion meter and cooled with liquid nitrogen at a rate of 3° C./min to measure its thermal expansion. The Ms point was determined from the temperature at which the thermal expansion curve sharply changed.

For a sample with which a sharp change in its thermal expansion curve did not recognized in the foregoing measurement, the sample was immersed in liquid nitrogen for 15 minutes, and then the microstructure was observed to check whether the martensite structure was present or not.

Inventive Example Nos. 1 to 8 shown in Table 1 each had the amounts of the chemical components and the composition falling within the ranges of the invention, and were manufactured by powder additive manufacturing. In each of Inventive Example Nos. 1 to 8, α representing the average thermal expansion coefficient in the temperature range between 100° C. and −70° C. fell within the range of 0±0.2 ppm/° C., and the Ms point was not higher than −196° C. No. 4 and No. 8 have similar compositions; however, in No. 4, 7C+1.5Si+Mn was not more than 0.4, while in No. 8, it exceeded 0.4. Comparing these cases, whereas α fell within the range of 0±0.2 ppm/° C. in both cases, α of No. 4 satisfying the condition of 7C+1.5Si+Mn being 0.4 or less was smaller than α of No. 8.

Figure 4:
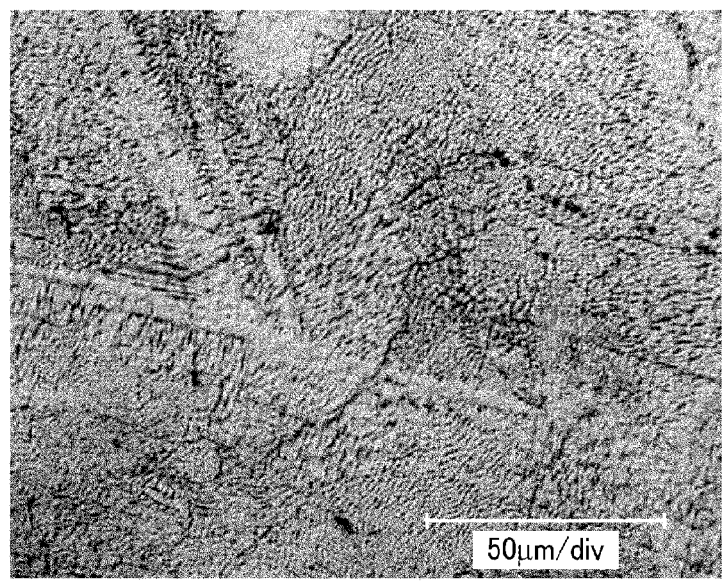
FIG. 4 is a photograph showing DAS of a product made by laser additive manufacturing, which product is made of alloy with composition according to the invention.

FIG. 4 is an optical micrograph of Inventive Example No. 7. The DAS of No. 7 was actually measured using this optical micrograph, and the DAS was found to be 1.4 μm, i.e., not more than 5 μm. Based on this DAS value, the cooling rate was estimated to be 1.5×10^5° C./sec.

From the foregoing results, it was confirmed that the alloy of the invention has properties that satisfy severe requirements in the aerospace field.

Meanwhile, in Nos. 11 to 17 of Comparative Examples A, although the amounts of the chemical components and the composition were the same as those of Inventive Example Nos. 1 to 7, the samples were manufactured by casting with the pure copper mold, and the DAS values thereof exceeded 5 μm, i.e., out of the range of the invention. FIG. 5 is an optical micrograph of No. 17 of Comparative Example A. The DAS of No. 17 obtained by casting with the pure copper mold was actually measured using this optical micrograph, and the DAS was found to be 16 μm. Accordingly, in each of Nos. 11 to 17, α was out of the range of 0±0.2 ppm/° C.

In Nos. 18 to 24 of Comparative Examples B, the amounts of the chemical components and the composition were out of the ranges of the invention, and in each example, samples were made by additive manufacturing as well as casting with the pure copper mold. The amount of C in No. 18, the amount of Si in No. 19, the amount of Mn in No. 20, and the amounts of Ni and Ni equivalent in No. 22 exceeded the relevant upper limit values, and therefore, each case had a out of the range of 0±0.2 ppm/° C. regardless of the manufacturing method. The amount of Co in No. 23 exceeded the lower limit value, and therefore, α was out of the range of 0±0.2 ppm/° C. regardless of the manufacturing method. The amount of Ni in No. 21 was less than the lower limit value, and therefore, α was out of the range of 0±0.2 ppm/° C. and the Ms point was higher than −196° C. regardless of the manufacturing method. No. 24 of Comparative Example B used a conventional alloy, SI, and the Ms point was higher than −196° C. regardless of the manufacturing method.

TABLE 1

| Type | No. | Chemical component (mass %) | | | | | | | −70° C. to 100° C. average thermal expansion coefficient (ppm/° C.) | | Ms point (° C.) | |
|---|---|---|---|---|---|---|---|---|---|---|---|---|
| | | C ≤0.015 | Si ≤0.10 | Mn ≤0.15 | Ni 35.0/37.0 | Co <2.0 | 7C + 1.5Si + Mn ≤0.4 | Ni + 0.8 Co 35.0/37.0 | Pure copper mold DAS: 16 μm | Additive manufacturing DAS: 1.4 μm | Pure copper mold DAS: 16 μm | Additive manufacturing DAS: 1.4 μm |
| Inventive example | 1 | 0.006 | 0.07 | 0.11 | 35.2 | 0.04 | 0.26 | 35.2 | | 0.19 | | <−196 |
| | 2 | 0.005 | 0.04 | 0.12 | 36.8 | 0.10 | 0.22 | 36.9 | | 0.17 | | <−196 |
| | 3 | 0.003 | 0.04 | 0.09 | 35.8 | 0.35 | 0.17 | 36.1 | | −0.05 | | <−196 |
| | 4 | 0.014 | 0.09 | 0.13 | 35.4 | 1.15 | 0.36 | 36.3 | | 0.15 | | <−196 |
| | 5 | 0.010 | 0.08 | 0.10 | 35.5 | 1.53 | 0.29 | 36.7 | | 0.14 | | <−196 |
| | 6 | 0.013 | 0.08 | 0.12 | 35.3 | 1.71 | 0.33 | 36.7 | | 0.16 | | <−196 |
| | 7 | 0.014 | 0.09 | 0.14 | 35.1 | 1.95 | 0.37 | 36.7 | | 0.19 | | <−196 |
| | 8 | 0.015 | 0.10 | 0.15 | 35.4 | 1.20 | 0.41 | 36.4 | | 0.19 | <−196 | <−196 |
| Comparative example A | 11 | 0.006 | 0.07 | 0.11 | 35.2 | 0.04 | 0.26 | 35.2 | 1.06 | | <−196 | |
| | 12 | 0.005 | 0.04 | 0.12 | 36.8 | 0.10 | 0.22 | 36.9 | 1.05 | | <−196 | |
| | 13 | 0.003 | 0.04 | 0.09 | 35.8 | 0.35 | 0.17 | 36.1 | 0.63 | | <−196 | |
| | 14 | 0.014 | 0.09 | 0.13 | 35.4 | 1.15 | 0.36 | 36.3 | 0.76 | | <−196 | |
| | 15 | 0.010 | 0.08 | 0.10 | 35.5 | 1.53 | 0.29 | 36.7 | 0.77 | | <−196 | |

TABLE 1-continued

| | | Chemical component (mass %) | | | | | | | −70° C. to 100° C. average thermal expansion coefficient | | | |
| | | | | | | | | | (ppm/° C.) | | Ms point (° C.) | |
| Type | No. | C ≤0.015 | Si ≤0.10 | Mn ≤0.15 | Ni 35.0/37.0 | Co <2.0 | 7C + 1.5Si + Mn ≤0.4 | Ni + 0.8Co 35.0/37.0 | Pure copper mold DAS: 16 μm | Additive manufacturing DAS: 1.4 μm | Pure copper mold DAS: 16 μm | Additive manufacturing DAS: 1.4 μm |
|---|---|---|---|---|---|---|---|---|---|---|---|---|
| | 16 | 0.013 | 0.08 | 0.12 | 35.3 | 1.71 | 0.33 | 36.7 | 0.76 | | <−196 | |
| | 17 | 0.014 | 0.09 | 0.14 | 35.1 | 1.95 | 0.37 | 36.7 | 0.75 | | <−196 | |
| Comparative | 18 | 0.018 | 0.08 | 0.12 | 35.2 | 0.40 | 0.37 | 35.5 | 0.98 | 0.24 | <−196 | <−196 |
| example B | 19 | 0.012 | 0.13 | 0.11 | 35.3 | 1.92 | 0.39 | 36.8 | 0.84 | 0.26 | <−196 | <−196 |
| | 20 | 0.011 | 0.07 | 0.22 | 35.4 | 1.70 | 0.40 | 36.8 | 0.87 | 0.27 | <−196 | <−196 |
| | 21 | 0.009 | 0.09 | 0.13 | 34.6 | 0.75 | 0.33 | 35.2 | 1.00 | 0.25 | −55 | −183 |
| | 22 | 0.008 | 0.06 | 0.11 | 37.2 | 0.01 | 0.26 | 37.2 | 1.24 | 0.30 | <−196 | <−196 |
| | 23 | 0.012 | 0.08 | 0.13 | 35.1 | 2.40 | 0.33 | 37.0 | 0.76 | 0.22 | <−196 | <−196 |
| | 24 | 0.005 | 0.15 | 0.27 | 32.1 | 5.09 | 0.53 | 36.2 | 0.08 | 0.11 | −36 | −78 |

The invention claimed is:

1. A low thermal expansion alloy comprising, in mass %:
C: 0.003% or more and 0.015% or less;
Si: 0.10% or less;
Mn: 0.15% or less;
Ni: 35.0% to 37.0%;
Co: 0.15% or more and less than 2.0%; and
Ni+0.8Co: 35.0% to 37.0%,
with the balance being Fe and inevitable impurities,
wherein the low thermal expansion alloy has a solidification structure with a secondary dendrite arm spacing of 5 μm or less,
an average thermal expansion coefficient in a temperature range between 100° C. and −70° C. falls within a range of 0±0.2 ppm/° C., and
an Ms point is −196° C. or lower.

2. The low thermal expansion alloy according to claim 1, wherein contents of C, Si and Mn satisfy C×7+Si×1.5+Mn≤0.40.

3. A method for producing a low thermal expansion alloy according to claim 1, the method comprising:
melting and solidifying a low thermal expansion alloy material having the composition according to claim 1 by means of a laser or electron beam to carry out additive manufacturing, thereby producing a low thermal expansion alloy having an average thermal expansion coefficient in a temperature range between 100° C. and −70° C. falling within a range of 0±0.2 ppm/° C. and an Ms point of −196° C. or lower.

4. The method for producing a low thermal expansion alloy according to claim 3, wherein the low thermal expansion alloy material is powder.

5. A method for producing a low thermal expansion alloy according to claim 2, the method comprising:
melting and solidifying a low thermal expansion alloy material having the composition according to claim 2 by means of a laser or electron beam to carry out additive manufacturing, thereby producing a low thermal expansion alloy having an average thermal expansion coefficient in a temperature range between 100° C. and −70° C. falling within a range of 0±0.2 ppm/° C. and an Ms point of −196° C. or lower.

6. The method for producing a low thermal expansion alloy according to claim 5, wherein the low thermal expansion alloy material is powder.

* * * * *